United States Patent
Fujita et al.

(10) Patent No.: US 7,489,876 B2
(45) Date of Patent: Feb. 10, 2009

(54) OPTICAL TRANSMISSION SYSTEM HAVING NOISE-ELIMINATION FUNCTION

(75) Inventors: Takehiro Fujita, Kawasaki (JP); Motoyoshi Sekiya, Kawasaki (JP); Hidezumi Natori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 421 days.

(21) Appl. No.: 10/901,984

(22) Filed: Jul. 30, 2004

(65) Prior Publication Data

US 2005/0201754 A1 Sep. 15, 2005

(30) Foreign Application Priority Data

Mar. 12, 2004 (JP) ............... 2004-069950

(51) Int. Cl.
*H04B 10/02* (2006.01)
(52) U.S. Cl. .......................... 398/177; 398/38
(58) Field of Classification Search ................ 398/173, 398/177, 180, 181, 38, 94, 197
See application file for complete search history.

(56) References Cited

U.S. PATENT DOCUMENTS

| | | | | |
|---|---|---|---|---|
| 5,523,874 A * | 6/1996 | Epworth | ...................... | 398/28 |
| 6,043,922 A * | 3/2000 | Koga et al. | ................... | 398/213 |
| 6,462,844 B1 * | 10/2002 | Kai et al. | ...................... | 398/79 |
| 6,639,716 B1 | 10/2003 | Tomofuji | | |
| 6,678,441 B1 * | 1/2004 | Taylor | ......................... | 385/24 |
| 6,845,108 B1 * | 1/2005 | Liu et al. | ...................... | 372/20 |
| 7,092,148 B1 * | 8/2006 | Haggans et al. | ......... | 359/337.11 |
| 7,263,291 B2 * | 8/2007 | Mahgerefteh et al. | ......... | 398/82 |
| 2002/0024736 A1 * | 2/2002 | Itou | .......................... | 359/578 |
| 2003/0133651 A1 * | 7/2003 | Hakimi et al. | ................. | 385/27 |

FOREIGN PATENT DOCUMENTS

| | | |
|---|---|---|
| JP | 10-013357 | 1/1998 |
| JP | 10-135549 | 5/1998 |
| JP | 2000-232433 | 8/2000 |

\* cited by examiner

*Primary Examiner*—Christina Y Leung
(74) *Attorney, Agent, or Firm*—Staas & Halsey LLP

(57) ABSTRACT

The present invention is aimed at providing a low-cost optical transmission system of simple configuration, capable of achieving a satisfactory OSNR even in the time of transmission of a small number of wavelengths. To this end, the optical transmission system is provided with a noise elimination unit corresponding to each of optical amplifiers arranged on a transmission path. This noise elimination unit includes a transmission characteristic capable of selectively transmitting a light in a wavelength band in which a signal light exists through an amplification band of the optical amplifier, and includes a function of automatically eliminating a noise light in a wavelength band in which a signal light does not exist, of noise lights generated in the optical amplifiers.

12 Claims, 9 Drawing Sheets

OPTICAL TRANSMISSION SYSTEM HAVING NOISE-ELIMINATION FUNCTION

BACKGROUND OF THE INVENTION

1. Field of the Invention

The present invention relates to an optical transmission system in which signal light is transmitted while being amplified with an optical amplifier, and in particular relates to an optical transmission system having a function of automatically eliminating noise occurring due to amplified spontaneous emission light generated in an optical amplifier.

2. Description of the Related Art

With the recent rapid popularization of the Internet and electronic trading and the like, optical transmission technology capable of large-capacity and long-distance transmission has been desired, and wavelength division multiplexing (WDM) transmission technology is currently the subject of much attention. In a WDM transmission system, there are provided optical amplifiers, at intervals of approximately 100km, each of which collectively amplifies a wavelength division multiplexed signal light just as it is, without converting into an electrical signal.

As one of optical amplifiers utilized in WDM transmission systems, a rare-earth element doped fiber amplifier is mainly used, in which a core portion of an optical fiber is doped with rare earth ions such as erbium or the like. When a WDM signal light is amplified using such a rare-earth element doped fiber amplifier, an amplified spontaneous emission light (ASE) is generated in the amplifier. This ASE is superimposed on the signal light, to act as a type of noise, causing a reduction of an optical signal to noise ratio (OSNR). In order to transmit the signal light without an occurrence of error, generally, the OSNR of a given value or greater is required, and the reduction of the OSNR as above described significantly affect the deterioration of system performance.

Currently, the number of channels (number of wavelengths of the signal light) to be wavelength division multiplexed exceeds 170 waves in practical levels, and will further be increased in the near future. Moreover, it is predicted that the bandwidth available to the optical amplification will further be extended in the near future. However, when apparatuses such as the above described optical amplifiers and the like are introduced into a physical circuit, in many cases, the number of wavelengths connected in an initial operation stage is approximately ten waves at most. Therefore, as shown in (B) of FIG. 14 for example, when the number of operational wavelengths is extremely small (or the operational bandwidth is extremely narrow) in relation to the bandwidth of the optical amplifier, the proportion of the signal light to the ASE in the total optical power in the input and output of the optical amplifier becomes extremely small. As a result, the signal light level per channel in the output of the optical amplifier is reduced with respect to a primary target value (design value), causing the deterioration of the OSNR, and the degradation of transmission characteristics.

As shown in a conceptual diagram in FIG. 15, as conventional technology to suppress the deterioration in transmission quality when a small number of wavelengths is operated in such a WDM transmission system, there has been proposed an ASE correction method) of predicting the reduction of signal light level due to ASE by the calculation, and increasing an amplification factor of the amplifier by this amount compared with a normal time, to compensate for the reduction of signal light level (refer to Japanese Unexamined Patent Publication No. 2000-232433).

In the above described conventional technology, in order to determine a reduced amount in the signal level due to ASE by the calculation, information relating to at least the following parameters is necessary:

(1) Input signal light power and noise figure (NF) of the optical amplifier at that time.
(2) Number of wavelengths.
(3) ASE bandwidth of the optical amplifier.
(4) Cumulative ASE in the case where the optical amplifiers are connected in multi-stages.

However, in order to acquire with accuracy the information relating to these parameters, to execute the ASE correction, there are required a mechanism which collects to notify the above information, and means for calculating a required value necessary for the ASE correction based on this acquired information, resulting in the disadvantage of complexity in configuration and control of the system.

Moreover, since the required value necessary for ASE correction is determined by the calculation, an error in correction value is increased depending on the accuracy of each parameter, causing the deterioration of transmission quality. That is to say, in the case where an increment in the amplification factor becomes insufficient due to the error in the correction value, the peak level of the signal light becomes less than a normal (a specified value), and the OSNR is deteriorated abruptly. On the other hand, in the case where the increment in the amplification factor becomes excessive due to the error in the correction value, since the peak level of the signal light becomes greater than the specified value, the pulse waveform comprising information bits is deteriorated due to a non-linear optical effect, such as a four-wave mixing (FWM) effect, a cross phase modulation (XPM) effect or the like, which occurs in the optical fiber of the transmission path.

Furthermore, in the case where the optical amplifiers are connected in multi-stages as shown in FIG. 16 for example, since the ASE generated in the optical amplifier in each stage is accumulated as traveling toward the downstream direction, the reduction of the signal light level due to the ASE is increased in the optical amplifier disposed on the downstream stage, resulting in the significant deterioration in the OSNR. In the above described conventional technology, since the level of the cumulative ASE input to the optical amplifier arranged in the downstream is increased, the increment in the amplification factor for correcting the reduction of the signal light level becomes larger. Therefore, when the number of connection stages (the number of spans) is large, sometimes, it is impossible to realize the required ASE correction in the downstream optical amplifier due to hardware restrictions, and a limit of the ASE correction performance may cause a restriction in the number of spans. Alternatively, in order to increase the number of spans, it becomes necessary to use high-performance optical amplifiers capable of realizing the above described required ASE correction, resulting in an increase of cost.

SUMMARY OF THE INVENTION

The present invention has been accomplished in view of the above described problems, with an object of providing a low-cost optical transmission system of simple configuration, capable of realizing a satisfactory OSNR even in the transmission time of a small number of wavelengths.

In order to achieve the above described object, an optical transmission system according to the present invention, which transmits a wavelength division multiplexed signal light while amplifying it using an optical amplifier, comprises noise elimination means having a transmission characteristic capable of selectively transmitting a light in a wavelength band in which a signal light exists, through an amplification band of the optical amplifier, for eliminating a noise light in a wavelength band in which a signal light does not exist, from noise lights generated in the optical amplifier.

In the optical transmission system of such a configuration, since the noise light in the wavelength band in which a signal light does not exist, is eliminated automatically by the noise elimination means from the noise lights generated in the optical amplifier, a satisfactory OSNR is obtained even when a small number of wavelengths is operated.

As one aspect of the above described optical transmission system, the noise elimination means may comprise: a plurality of filter sections connected to each other in series and each having variable transmissivity for each wavelength band obtained by dividing the amplification band of the optical amplifier into a plurality of blocks; and a control section that controls the transmissivity of the filter section corresponding to the wavelength band in which a signal light exists, to a maximum, based on wavelength information related to a signal light in operation, and also controls the transmissivity of the filter section corresponding to the wavelength band in which a signal light does not exist, to a minimum. In such a configuration, the wavelength division multiplexed signal light input to the noise elimination means passes in turn through each filter section of which transmission characteristics are controlled in accordance with the signal light wavelength in operation, and thus the noise light in the wavelength band in which a signal light does not exist is automatically eliminated.

Moreover, as a further aspect of the above described optical transmission system, the noise elimination means may comprise: an optical filter capable of selecting a plurality of transmission wavelengths independently, and a control section that controls the optical filter so that a signal light wavelength in operation is selected as the transmission wavelength, based on wavelength information related to a signal light in operation. In such a configuration, the wavelength division multiplexed signal light input to the noise elimination means passes through one optical filter in which the transmission wavelength is selected in accordance with the signal light wavelength in operation, and thus a noise light in the wavelength band in which a signal light does not exist is automatically eliminated.

Furthermore, the above described optical transmission system may be provided with correction control means for measuring the optical power which was not selected by the optical filter and eliminated, and judging the power of the noise light included in the transmitted light selected by the optical filter based on the measurement result, to perform a correction control of an amplification factor of the optical amplifier in accordance with the judging result. As a result, in addition to the elimination of the noise light in the wavelength band in which a signal light does not exist, the reduction in signal light level due to the noise light remaining in the wavelength band in which a signal light exists is compensated based on the measurement result of the power of the eliminated noise light.

Other objects, features, and advantages of the present invention will become apparent from the following description of the embodiments, in conjunction with the appended drawings.

DETAILED DESCRIPTION OF THE INVENTION

Figure 1:
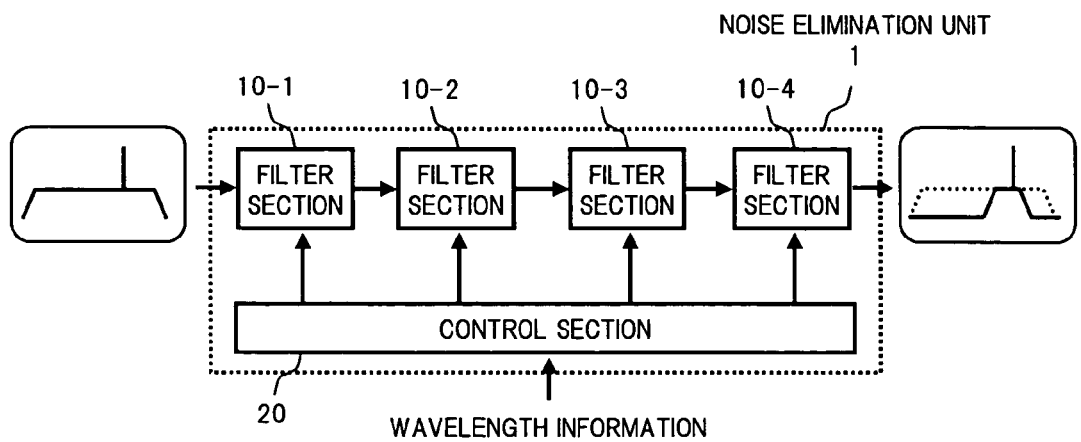
FIG. 1 is a diagram showing a configuration of a noise elimination unit used in an optical transmission system according to one embodiment of the present invention.

There will be described embodiments for implementing an optical transmission system having a noise elimination function according to the present invention, with reference to the appended drawings. The same reference numerals denote the same or equivalent parts in all drawings.

Figure 2:
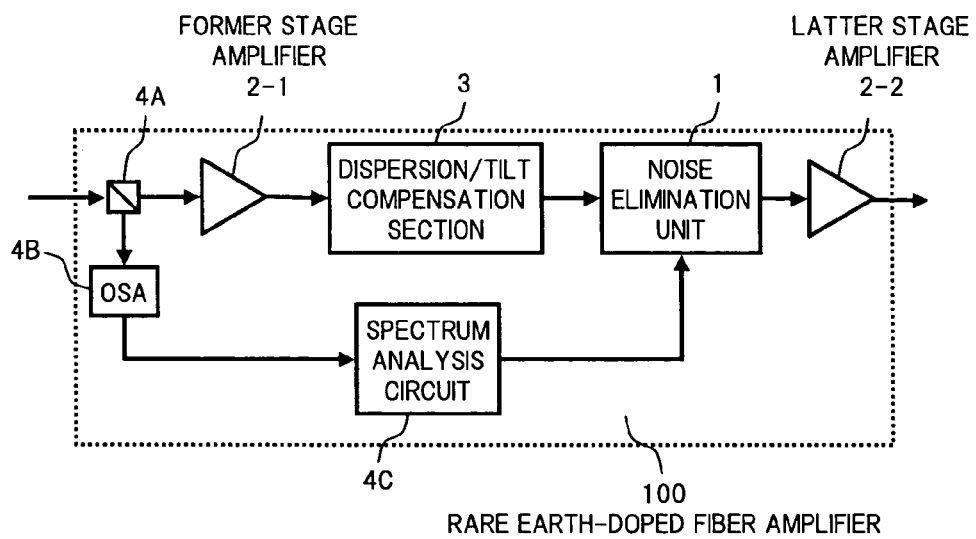
FIG. 2 is a diagram showing an example of an optical amplifier configured using the noise elimination unit of FIG. 1.

FIG. 1 is a diagram showing a configuration of a noise elimination unit used in the optical transmission system having the noise elimination function according to one embodiment of the present invention. Moreover, FIG. 2 is a diagram showing an example of an optical amplifier configured using the noise elimination unit of FIG. 1. Furthermore, FIG. 3 is a diagram showing an example of the optical transmission system configured using the optical amplifier of FIG. 2.

Figure 3:
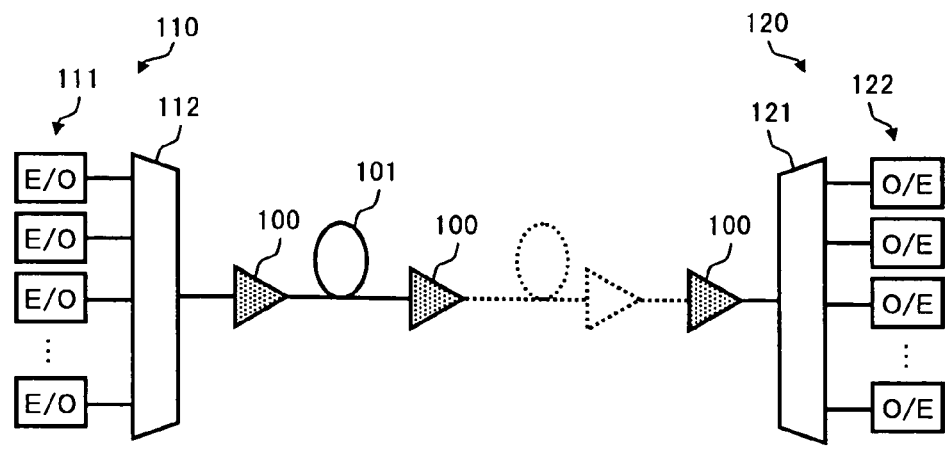
FIG. 3 is a diagram showing an example of the optical transmission system configured using the optical amplifier of FIG. 2.

As shown in FIG. 1 through FIG. 3, the optical transmission system having the noise elimination function in the present embodiment is constructed such that, for example, in a system configuration wherein an optical transmission station 110 and an optical receiving station 120 are connected via a transmission path 101 (FIG. 3), and optical amplifiers 100 are arranged at required intervals on the transmission path 101, and a WDM signal light transmitted from the optical transmission station 110 is repeatedly transmitted to the optical receiving station 120 via the transmission path 101 and the optical amplifiers 100, each optical amplifier 100 is provided with a noise elimination unit 1 as noise elimination means (FIG. 2), so that noise due to ASE generated in each optical amplifier 100 is automatically eliminated.

The noise elimination unit 1 comprises, for example, a plurality (four in this case) of filter sections 10-1 to 10-4 connected in series, and a control section 20 that controls variable transmission characteristics of each of the filter sections 10-1 to 10-4 (FIG. 1).

Figure 4:
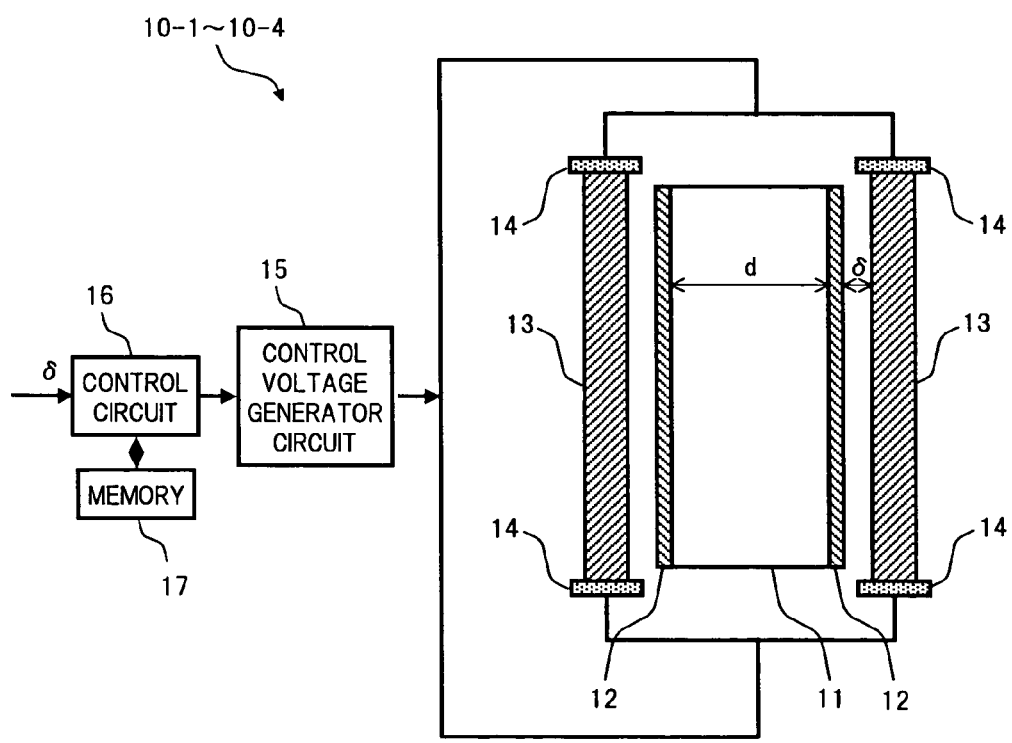
FIG. 4 is a diagram showing a specific example of each filter section constituting the noise elimination unit of FIG. 1.

Each of the filter sections 10-1 to 10-4, for example as shown in FIG. 4, is applied with an etalon-type band removal filter to achieve the variable transmission characteristics. More specifically, a typical etalon-type filter is used, in which a metallic film (or a dielectric multi-layered film) of a thickness of about a wavelength of an incident light is vapor-deposited onto opposite parallel planes of an optical crystal 11 such as quartz or the like to form reflective surfaces 12. In this etalon-type filter, metal (or dielectric) substances 13 of a sufficient thickness in relation to the wavelength of the incident light are each arranged at a position separated at a distance δ towards the outside from the reflective surface 12. Each metal (or dielectric) substance 13 is fastened to an actuator 14 applied with, for example, an accurate screw, a piezo-electric device, or MEMS technology, so that the spacing δ with the reflective surface 12 can be varied in response to an operation of the actuator 14. The actuator 14 is driven by a control voltage output from a control voltage generator circuit 15. The control voltage generator circuit 15 is controlled in accordance with an output signal from a control circuit 16. The control circuit 16 refers to data stored in a memory 17 based on information related to the spacing δ sent from the control section 20 to determine the drive voltage for the actuator 14, and outputs the determination result to the control voltage generator circuit 15. The transmission characteristics of the filter section of this configuration are described later.

In accordance with the wavelength information provided from the exterior of the noise elimination unit 1, the control section 20 (FIG. 1) generates and outputs a signal for controlling the transmission characteristics of each of the filter sections 10-1 to 10-4 depending upon whether or not a signal light exists in a wavelength band allocated to each of the filter sections 10-1 to 10-4, as described later.

The optical amplifier 100 (FIG. 2) is, for example, of a two-stage configuration in which the noise elimination unit 1 is arranged between a former stage amplifier 2-1 and a latter stage amplifier 2-2 connected in series. For the former stage amplifier 2-1 and the latter stage amplifier 2-2, there is used a typical rare-earth element doped fiber amplifier, which amplifies a signal light propagated through a rare-earth element doped fiber (not shown in drawings), by supplying a pumping light to the rare earth-dope fiber. A dispersion/tilt compensation section 3 is provided between the former stage amplifier 2-1 and the noise elimination unit 1. This dispersion/tilt compensation section 3 is provided as necessary with a well-known dispersion compensator, which compensates for wavelength dispersion and polarization dispersion occurred in the signal light input to the optical amplifier 100, or a well-known gain compensator, which compensates for wavelength dependence of gains of the former stage amplifier 2-1 and latter stage amplifier 2-2.

Moreover, the optical amplifier 100 comprises an optical coupler 4A, an optical spectrum analyzer (OSA) 4B, and a spectrum analysis circuit 4C as means for providing the wavelength information to the noise elimination unit 1. The optical coupler 4A branches a part of the signal light input to the former stage amplifier 2-1, to send it to the optical spectrum analyzer 4B as a monitor light. The optical spectrum analyzer 4B measures the spectrum of the monitor light from the optical coupler 4A, to output the measurement result to the spectrum analysis circuit 4C. The spectrum analysis circuit 4C analyzes the measurement result from the optical spectrum analyzer 4B to judge the number of wavelengths and the wavelength allocation of the signal light in operation, and sends the judgment result to the control section 20 of the noise elimination unit 1 as the wavelength information.

Next, there will be described an operation of the optical transmission system having the above described configuration.

Figure 5:
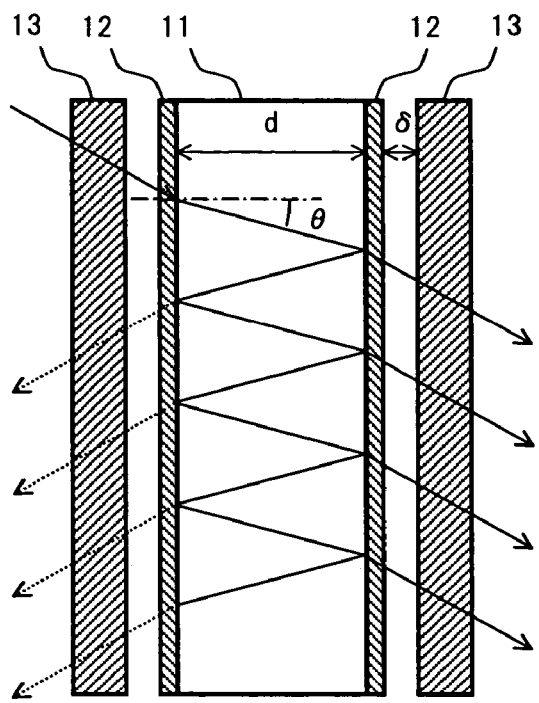
FIG. 5 is a diagram for explaining a function of the noise elimination unit of FIG. 1.
Figure 6:
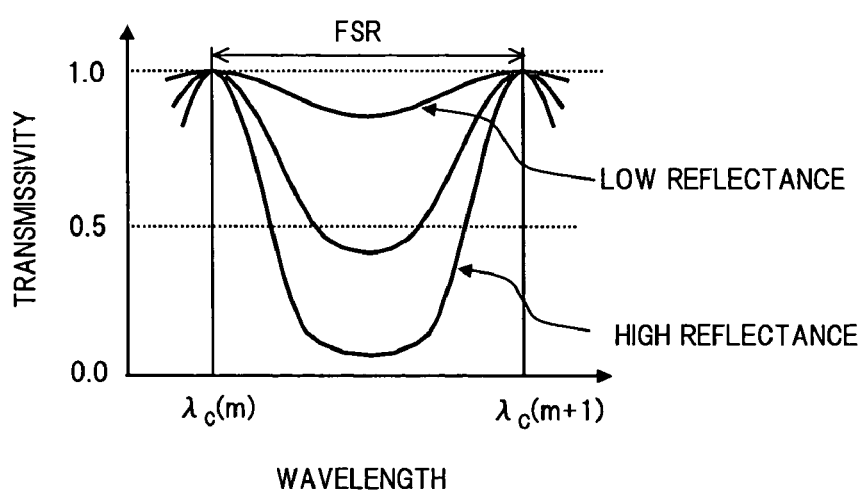
FIG. 6 is a diagram for explaining transmission wavelength characteristics of an etalon filter.
Figure 7:
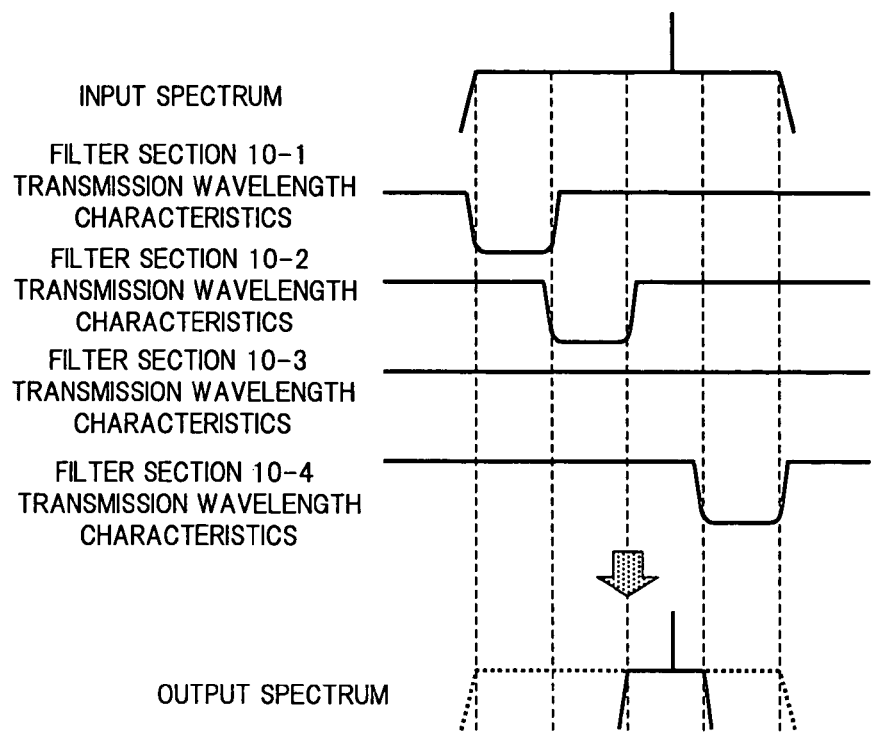
FIG. 7 is a diagram showing an example of transmission characteristics of each filter section in the noise elimination unit of FIG. 1.

Firstly, a function and a control operation of the noise elimination unit 1 are described in detail, with reference to FIG. 5 through FIG. 7.

In the etalon filter used in each of the filter sections 10-1 to 104 of the noise elimination unit 1, for example as shown in FIG. 5, when a light from the exterior is incident at a required angle, the incident light is repeatedly reflected between the parallel reflective surfaces 12, and part of the multiple reflection light is transmitted through one of the reflective surfaces 12 (in this case, as shown by the solid lines in FIG. 5, the surface on the side opposite the surface on which the light from the exterior is incident) to mutually interfere. As a result, the transmission characteristics of the etalon filter are such that the transmissivity thereof is changed periodically according to the wavelength (or the frequency) of the light. FIG. 6 exemplarily shows the transmission wavelength characteristics of a typical etalon filter.

In FIG. 6, a central wavelength $\lambda_c(m)$ of transmission band is represented by the following equation (1), wherein a distance between the parallel reflective surfaces 12 is d, a refractive index of the optical crystal 11 is n, an angle between the normal line of the reflective surfaces and a propagation direction of the multiple reflection light is θ, and the order is m.

$$\lambda_c(m) = \frac{2 \cdot n \cdot d}{m} \cos\theta \qquad (1)$$

Furthermore, a free spectrum range (FSR) indicating an interval between periodic transmission band peaks is given by the following equation (2).

$$FSR = \frac{c}{2 \cdot n \cdot d} \cos\theta [Hz] \qquad (2)$$

Moreover, it is possible to change the transmissivity of the etalon filter according to the reflectance at the time of multiple reflections. More specifically, the transmissivity T (λ) of the etalon filter is known to be represented by the following equation (3), wherein A as an absorption coefficient and R is the reflectance of the parallel flat plates constituting the etalon filter.

$$T(\lambda) = \frac{(1 - A - R)^2}{(1 - R)^2 + 4 \cdot R \cdot \sin^2(\Delta/2)} \qquad (3)$$

Here, Δ in equation (3) is an amount of phase shift at the time of multiple reflection, and is represented by the following equation (4).

$$\Delta = \frac{4\pi \cdot n \cdot d \cdot \cos\theta}{\lambda} \quad (4)$$

As shown in FIG. 4, in each of the filter sections 10-1 to 10-4 used in the noise elimination unit 1 of the present embodiment, the reflectance R at the time of multiple reflection is adjusted, to change the transmissivity of the etalon filter, by variably controlling the position of the metal (or dielectric) substance 13 arranged outside the etalon filter. Adjustment of this reflectance R is performed based on the following principle. That is to say, it is known that a part of the light leaks to outside of the etalon filter (near-field light) when the light is multiply reflected inside the etalon filter. The strength (electric field) of this near-field light is attenuated exponentially with respect to the distance from the surface of the etalon filter. Furthermore, the strength depends on the refractive index on the leakage side (the outside of the etalon filter), and the larger the refractive index becomes, a leaked amount is increased, while the reflectance R at the time of multiple reflection being decreased. Therefore, in the present embodiment, the position of the metal (or dielectric) substance 13 is variably controlled by the actuator 14 to adjust the spacing δ between the substance and the etalon filter is adjusted, to thereby change an average refractive index at which the leaked near-field light is apparent, to vary the reflectance R at the time of multiple reflection.

FIG. 7 shows a specific example of noise elimination in the present embodiment utilizing the transmission characteristics of the etalon filter as described above.

In the present embodiment, the transmission central wavelength and the free spectrum range (FSR) of each etalon filter, are designed so that the filter sections 10-1 to 10-4 of the noise elimination unit 1 are responsible for different regions in the amplification band of the optical amplifier 100. In the control section 20 of the noise elimination unit 1, it is judged whether or not a signal light exists in the wavelength band assigned to each of the filter sections 10-1 to 10-4, according to the wavelength information sent from the spectrum analysis circuit 4C, and a signal for controlling the actuator 14 is output so that the transmissivity of the filter section corresponding to the wavelength band in which a signal light does not exist is minimized (attenuation factor maximized). On the other hand, a signal for controlling the actuator 14 is output so that the transmissivity of the filter section corresponding to the wavelength band in which a signal light exists is maximized (attenuation factor minimized).

More specifically, in the case where a signal light having an input spectrum as shown in the top stage in the schematic diagram in FIG. 7 is given to the noise elimination unit 1, if the amplification band of the optical amplifier 100 corresponding to the band in which ASE is generated, is divided into four blocks, and the wavelength bands respectively corresponding to the blocks are set so as to be assigned to the filter sections 10-1 to 10-4 starting from the short wavelength side, a signal for setting the transmissivity to the maximum is transmitted from the control section 20 to the filter section 10-3 corresponding to a third wavelength band in which a signal light exists, from the short wavelength side, and the actuator 14 is controlled while a relationship between the spacing δ stored in the memory 17 and a drive voltage of the actuator 14 being referred to in accordance with the control signal, so that the transmission characteristics of the etalon filter are adjusted. Note, a signal light of at least one wave is arranged in the wavelength band in which the transmissivity reaches maximum in the filter section 10-3. On the other hand, the actuator 14 is controlled so that the transmissivity of each wavelength band is minimized in the filter sections 10-1, 10-2, and 10-4 corresponding to first, second, and fourth wavelength bands, in each of which a signal light does not exist, from the short wavelength side. The input light passes through the filter sections 10-1 to 10-4, the transmission characteristics of which are controlled, in that order, so that the light output from the noise elimination unit 1 has, as shown in the bottom stage of FIG. 7, a spectrum from which ASE in the wavelength band in which a signal light does not exist, is eliminated.

In the present embodiment, the construction has been such that the four filter sections are provided in the noise elimination unit 1, and the ASE band of the optical amplifier 100 is divided into four, to eliminate noise. However the number of divisions of the ASE band is not limited to the above described example. By increasing the number of divisions, noise can be eliminated with higher accuracy. This division must also take into consideration losses for when the filter sections are connected in multiple stages.

Figure 8:
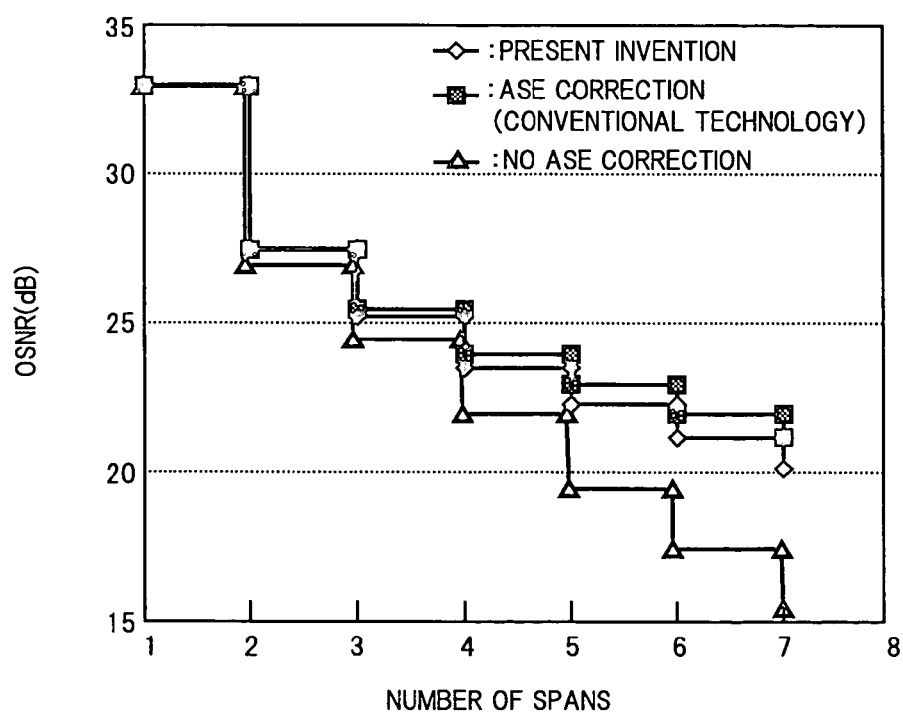
FIG. 8 is a graph showing calculation results of changes in OSNR in relation to the number of spans in the optical transmission system of FIG. 3.

In the optical transmission system of the present embodiment, since the noise elimination unit 1 having the above described functions is provided for each of the optical amplifiers 100 arranged at the required intervals on the transmission path 101, ASE corresponding to wavelength band in which a signal light does not exist, of ASE generated in each optical amplifier 100, can be automatically eliminated. As a result, even when a small number of wavelengths are operated, a satisfactory OSNR can be obtained. For example, the calculation result of a change in the OSNR to the number of spans is shown in FIG. 8, provided that the number of wavelengths of signal light is one wave, a span loss is 25dB, an output level of the optical amplifier 100 is +3 dBm/ch, a noise factor (NF) is 6.8 dB, the ASE bandwidth is 35 nm, and the number of divisions of ASE band is five (7 nm bandwidth per block). In FIG. 8, in addition to the calculation result (diamond-shaped symbols) for when the noise elimination according to the present invention is performed, the calculation result (square symbols) for when an ASE correction according to the conventional technology is performed and the calculation result (triangular symbols) for when the ASE correction is not performed, are shown. It is understood from the calculation results in FIG. 8 that, by performing the noise elimination according to the present invention, it is possible to obtain almost the same improvement in OSNR as that in the case where the ASE correction based on the conventional calculation is performed. The present optical transmission system, however, does not require functions of collecting and notifying information for correcting by calculation the reduction in signal light level due to ASE as in the conventional technique. Moreover, since it is fundamentally unnecessary to control an amplification factor of the optical amplifier for ASE correction, there is an advantage that the configuration and control of the system can be simplified.

Figure 9:
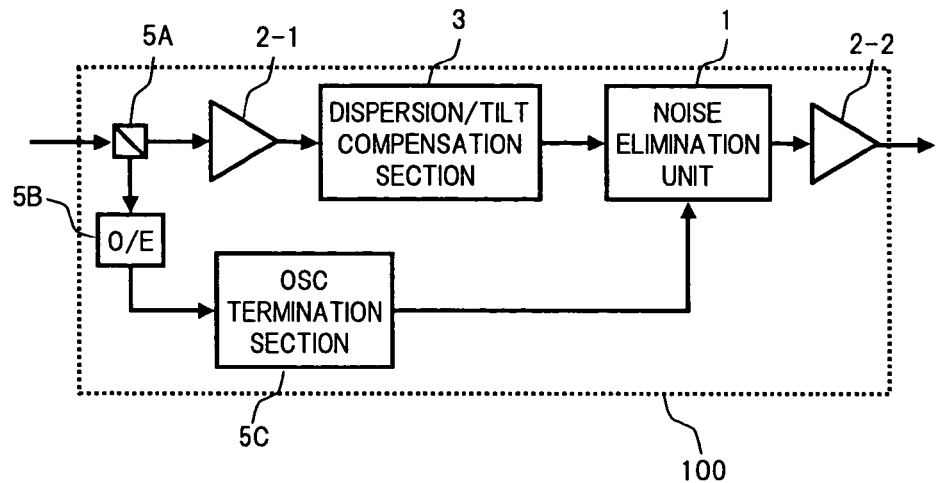
FIG. 9 is a diagram showing another configuration example of an optical amplifier using the noise elimination unit of FIG. 1.

In the above described embodiment, the optical amplifier 100 is provided, at the input stage thereof, with the optical coupler 4A, the optical spectrum analyzer 4B, and the spectrum analysis circuit 4C, as means for acquiring the wavelength information for the control of the transmission characteristics of each of the filter sections 10-1 to 10-4 of the noise elimination unit 1, to monitor the spectrum of the signal light input to the optical amplifier 100. However, in addition, for example, as shown in FIG. 9, it is also possible to acquire the wavelength information utilizing an optical supervisory channel (OSC) transmitted together with the signal light. More specifically, in a configuration example shown in FIG.

9, the OSC included in the light input to the optical amplifier 100 is extracted with a demultiplexer 5A, photo-electrically converted by an optical receiver (O/E) 5B, to be sent to an OSC termination section 5C. In the OSC termination section 5C, information relating to the number of wavelengths and the wavelength allocation of the signal light in operation transmitted by the OSC, is identified, and the identification result is given to the noise elimination unit 1 as the wavelength information.

Figure 10:
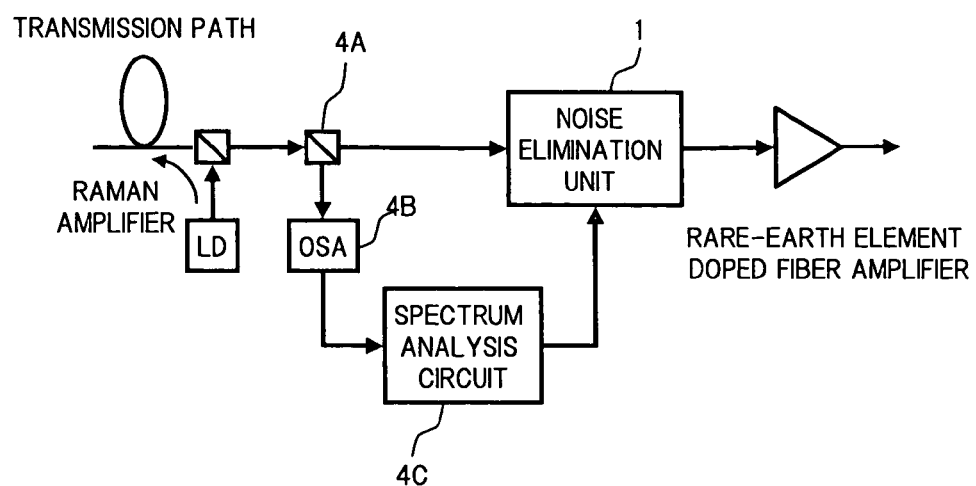
FIG. 10 is a diagram showing an example wherein the noise elimination unit of FIG. 1 is arranged in an input stage of the optical amplifier.

Moreover, in the above described embodiment, an example has been shown wherein the noise elimination unit 1 is arranged between the former stage amplifier 2-1 and the latter stage amplifier 2-2. However, as shown in FIG. 10, the noise elimination unit 1 may be arranged in the input stage of the optical amplifier. Such an arrangement of the noise elimination unit 1 is particularly effective when the transmission path is utilized, as an amplification medium, to Raman amplify the signal light. That is to say, the ASE light generated in the former stage rare-earth element doped fiber optical amplifier, and the noise light generated due to the Raman amplification in the transmission path can be simultaneously eliminated by the noise elimination unit 1, and thus, it is possible to give the signal light having a satisfactory OSNR to the next stage rare-earth element doped fiber optical amplifier.

Next, the description will be made on another embodiment of the optical transmission system having the noise elimination function of the present invention.

Figure 11:
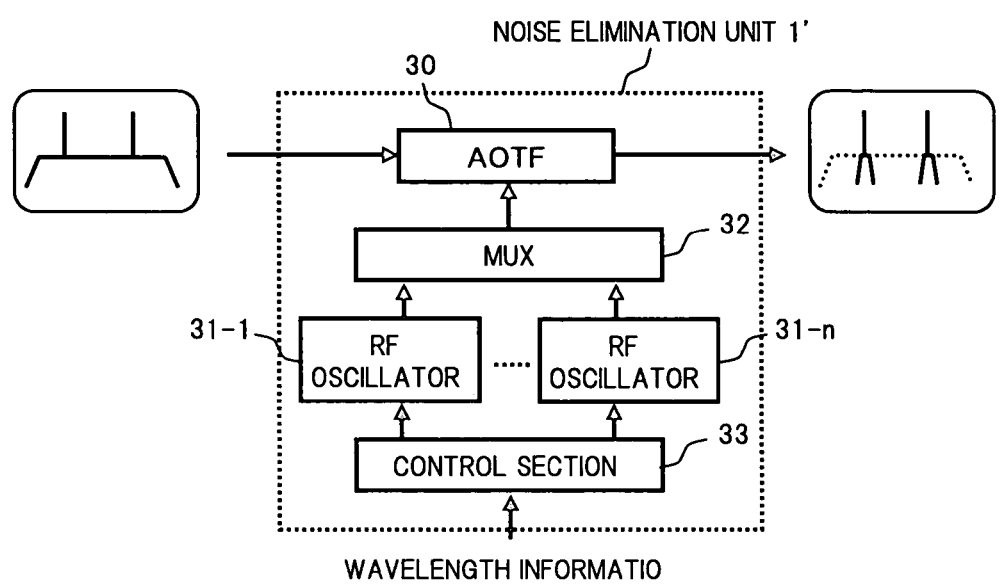
FIG. 11 is a diagram showing a configuration of a noise elimination unit used in an optical transmission system according to another embodiment of the present invention.

FIG. 11 shows a configuration of noise elimination unit used in the optical transmission system according to this other embodiment. Since the configuration of the optical amplifier to which the noise elimination unit of FIG. 11 is applied and the configuration of the overall optical transmission system, are similar to the previously described embodiment, the description thereof is omitted here.

In a noise elimination unit 1' shown in FIG. 11, a well-known acousto-optic tunable filter (AOTF) 30 capable of independently selecting a plurality of transmission wavelengths is utilized as an optical filter used for removal of noise. More specifically, although not shown in the figure, for example, a Mach-Zehnder type waveguide and an interdigital transducer (IDT) are formed on a lithium niobate (LN: $LiNbO_3$) substrate, and an RF signal of the frequency corresponding to the selected wavelength is applied to the interdigital transducer to generate a surface acoustic wave (SAW), and the light having the selected wavelength is output from a through-port based on an acousto-optic effect due to the SAW, and the lights having other wavelengths are output from a drop-port. Here, a plurality of RF oscillators 31-1 through 31-n (n oscillators in this case) corresponding to the total number of wavelengths of the transmitted lights are prepared, and the RF oscillator corresponding to the signal light in operation is driven under the control of the control section 33 to which the wavelength information is provided, to generate the RF signal of the frequency corresponding to the wavelength of the signal light. The RF signal output from each RF oscillator is multiplexed in a multiplexing circuit (MUX) 32 to be applied to the IDT of the AOTF 30, so that only the wavelength band in which a signal light exists is selected by the AOTF 30 to be output from the through-port, and the light in other wavelength bands in each of which a signal light does not exist, that is to say, ASE, is output from the drop-port of the AOTF 30 to be terminated or the like.

As a result, an automatic noise elimination function similar to that of the noise elimination unit 1 wherein the above described plurality of etalon filters are connected in series, is realized using a single AOTF 30. Furthermore, since the transmission band of the AOTF 30 is very narrow in comparison to that of the etalon filter and only a signal light can be efficiently extracted, it is possible to improve the noise elimination performance. Moreover, by appropriately selecting the frequency of the RF signal to be applied, the AOTF 30 can select (transmit) independently the signal lights having the plurality of wavelengths. Therefore, in comparison with the case where the etalon filter is used, it is possible to increase the degree of freedom in selection of wavelengths (channels).

Consequently, by arranging the noise elimination unit 1' utilizing the above described AOTF 30 in each optical amplifier 100 on the transmission path 101 to transmit the WDM signal light, the ASE corresponding to the wavelength band in which a signal light does not exit, of ASE generated in each optical amplifier 100, can be automatically eliminated with high accuracy. As a result it becomes possible to obtain a very satisfactory OSNR even when a small number of wavelengths are in operation.

The above described embodiment shows the case of utilizing the AOTF as an optical filter capable of selecting independently a plurality of transmission wavelengths. However, it is also possible to use a well-known dynamic gain equalizer (GEQ) capable of realizing a similar function, in place of the AOTF.

Next, there will be described an application example of the optical transmission system wherein the above described AOTF is used to perform the noise elimination.

Figure 12:
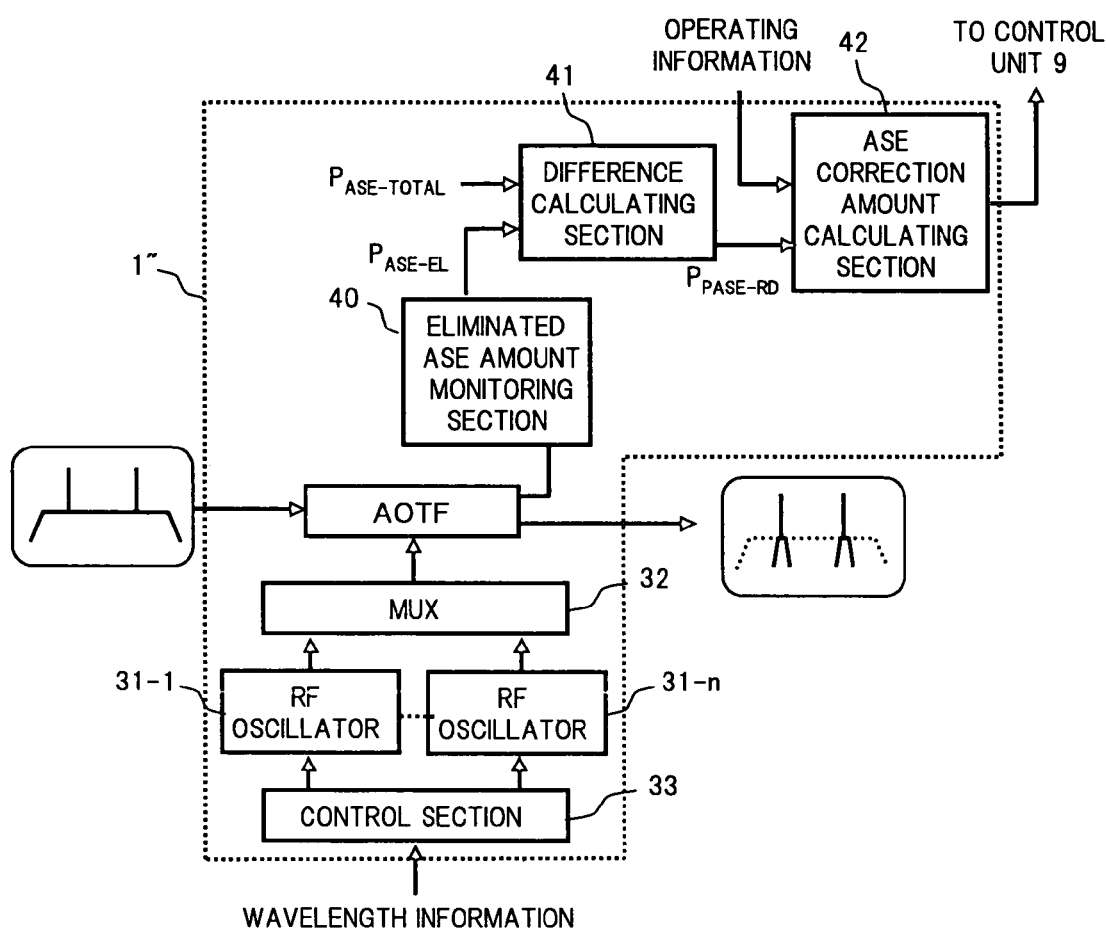
FIG. 12 is a diagram showing a configuration of a noise elimination unit used in an application example related to the optical transmission system of FIG. 11.
Figure 13:
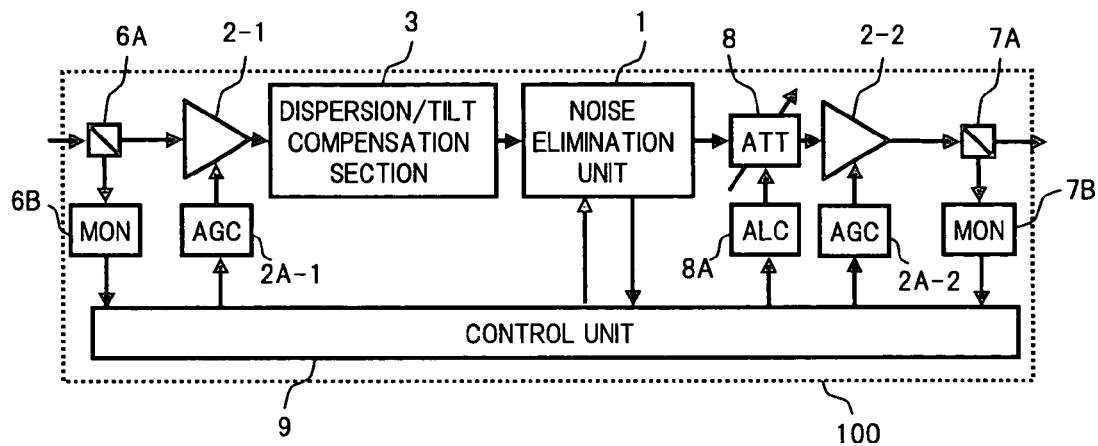
FIG. 13 is a diagram showing an example of an optical amplifier configured using the noise elimination unit of FIG. 12.
Figure 14:
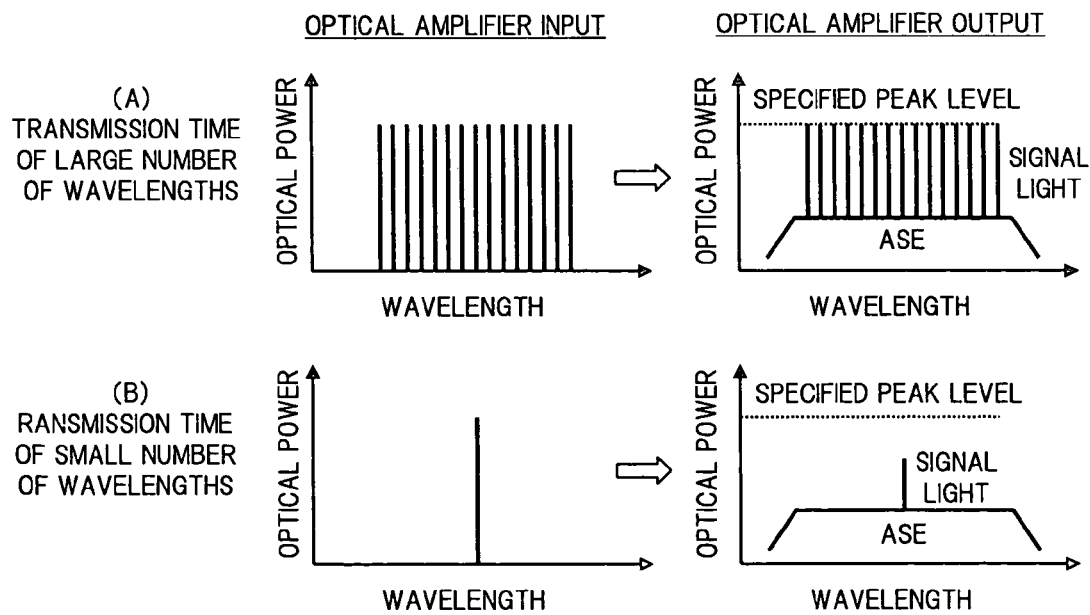
FIG. 14 is a diagram for explaining deterioration of the OSNR during the conventional transmission of a small number of wavelengths.
Figure 15:
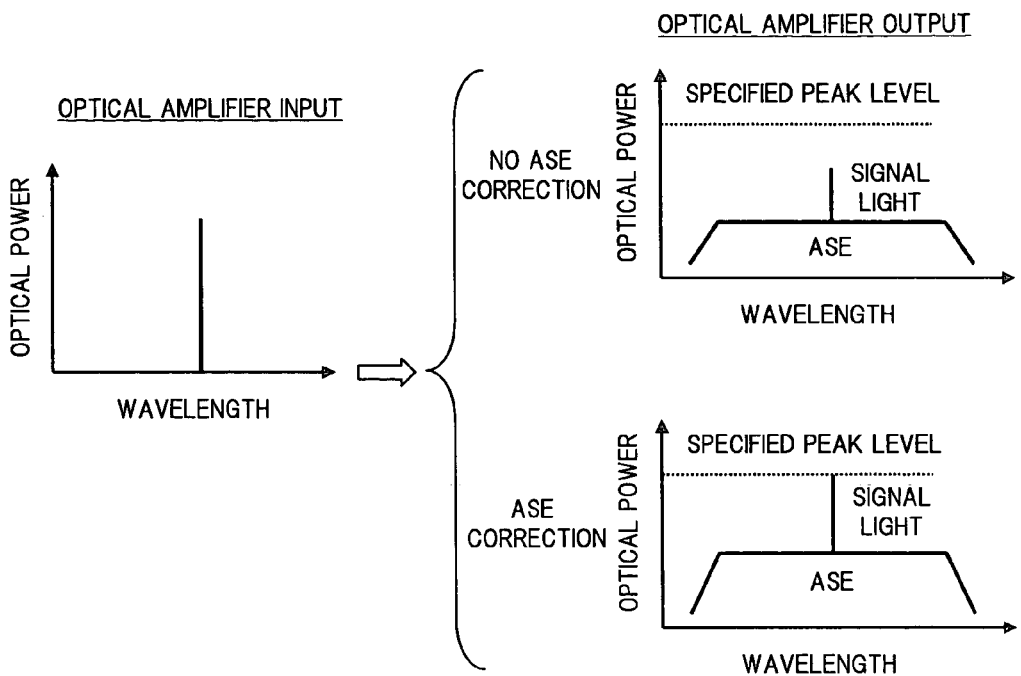
FIG. 15 is a diagram for explaining the concept of conventional ASE correction.

FIG. 12 shows a configuration of a noise elimination unit used in the application example of the optical transmission system. Furthermore, FIG. 13 shows an example of the optical amplifier configured using the noise elimination unit in FIG. 12. Since the overall configuration of the optical transmission system is similar to that shown in FIG. 3, the description thereof is omitted here.

A noise elimination unit 1" shown in FIG. 12 has a characteristic in that an eliminated ASE amount is monitored using the light output from the drop-port of the AOTF 30, and ASE is corrected in accordance with the principle similar to that of the conventional technique disclosed in Japanese Unexamined Patent Publication No. 2000-232433, based on the monitor result.

More specifically, the light output from the drop-port of the AOTF 30 is sent to an eliminated ASE amount monitoring section 40, and the power of the light dropped by the AOTF 30, that is to say, the total power of the eliminated ASE is measured. Here, the total power of the eliminated ASE monitored by the eliminated ASE amount monitoring section 40 is referred to as the eliminated ASE amount $P_{ASE-EL}$. This eliminated ASE amount $P_{ASE-EL}$ is transmitted to a difference calculating section 41. This difference calculating section 41 is given with the total ASE amount $P_{ASE-TOTAL}$ generated in the optical amplifier as obtained by the calculation, that is to say, the total power of ASE generated in all amplification bands including the wavelength band in which a signal light exists, and calculates a difference between the total ASE amount $P_{ASE-TOTAL}$ and the eliminated ASE amount $P_{ASE-EL}$ to obtain a residual ASE amount $P_{ASE-RD}$ in the wavelength band in which a signal light exists. The residual ASE amount PASE-RD obtained by this difference calculating section 41 is given to an ASE correction amount calculating section 42. The ASE correction amount calculating section 42 is given with operating information related to the power and the number of wavelengths of the signal light in operation, and the ASE bandwidth and the like, and calculates the ASE correction amount, in accordance with the principle similar to that of the conventional technique, using this operating information and the residual ASE amount $P_{ASE-RD}$ from the difference calculating section 41, to transmit the calculation result to a control unit 9 (FIG. 13) of the optical amplifier 100.

The control unit 9 that received a signal indicating the ASE correction amount from the noise elimination unit 1", adjusts the amplification factor in the optical amplifier 100 in accordance with the ASE correction amount, to compensate for the reduction in the signal level due to the residual ASE. More specifically, this adjustment of the amplification factor is performed by adjusting the gain setting of the former stage amplifier 2-1 or the latter stage amplifier 2-2 by an AGC circuit 2A-1 or 2A-2, or by adjusting the attenuation setting of a variable attenuator (ATT) 8 by an ALC circuit 8A. Each of the AGC circuits 2A-1 and 2A-2 is a well-known circuit controlling the pumping light supply power for each of the amplifiers 2-1 and 2-2, so that a gain calculated based on the input and output light power measured by an input monitor 6B and an output monitor 7B becomes fixed at a predetermined value. Moreover, the ALC circuit 8A is a well-known circuit controlling the attenuation of the variable attenuator 8, so that the output light level measured by the output monitor 7B is fixed at a predetermined value.

Figure 16:
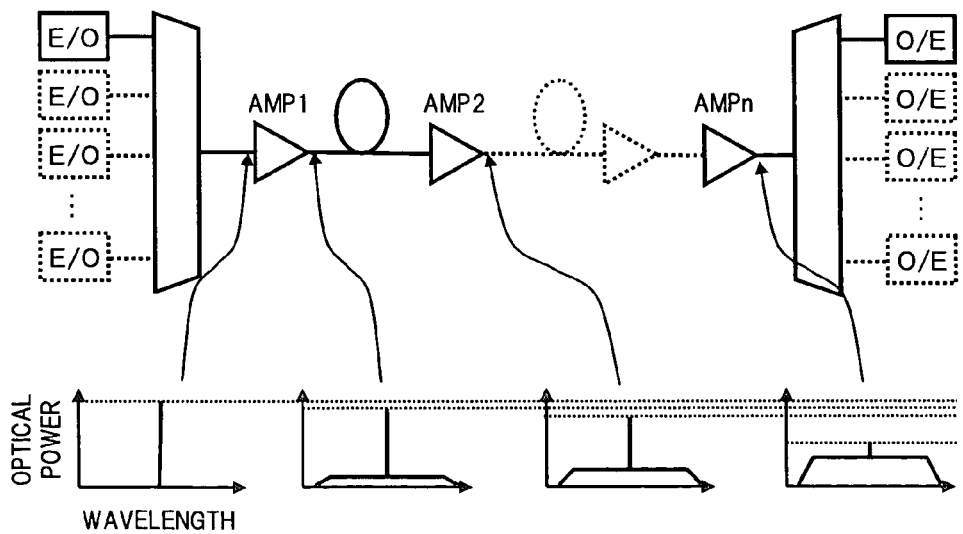
FIG. 16 is a diagram for explaining deterioration of the OSNR due to cumulative ASE in a system wherein conventional optical amplifiers are connected in multi-stages.

By measuring the eliminated ASE amount PASE-EL utilizing the light output from the drop-port of the AOTF 30, and calculating the residual ASE amount PASE-RD based on the measurement result to perform the ASE correction, it becomes possible to obtain a more satisfactory OSNR. Furthermore, in the ASE correction performed here, since ASE in the wavelength band in which a signal light does not exist, is eliminated by the noise elimination unit 1", the correction amount becomes less than that in the conventional ASE correction. Consequently, it becomes possible to cope with the conventional case where the cumulative ASE due to the multistage connection of the optical amplifiers becomes a limit in the ASE correction due to hardware restrictions (refer to FIG. 16), by concurrently performing the noise elimination according to the present invention, thereby achieving an effect of a significantly high possibility of avoiding restrictions on the number of transmissible spans due to insufficient ASE correction performance.

What is claimed is:

1. An optical amplifier device disposed on an optical transmission line, comprising:
    a coupler to divide a wavelength division multiplexed signal light input to the optical amplifier device;
    an amplifier to amplify a part of the wavelength division multiplexed signal light input to the optical amplifier device, received from the coupler;
    a wavelength information generating unit to analyze another part of the wavelength division multiplexed signal light input to the optical amplifier device, received from the coupler, and to generate wavelength information of a signal carried by the wavelength division multiplexed signal light; and
    a noise elimination unit to filter out noise from wavelength bands of the amplified wavelength division multiplexed signal light, while preserving the signal according to the wavelength information, wherein
    said noise elimination unit comprises an optical filter capable of selecting a plurality of transmission wavelengths independently,
    a control section controls said optical filter so that a signal light wavelength of the signal light is selected as a transmission wavelength, based on the wavelength information of the signal light, and
    the optical amplifier device further comprising correction control means for measuring an optical power which was not selected by said optical filter and eliminated, and judging a power of the noise light included in the transmitted light selected by said optical filter based on the measuring, to perform a correction control of an amplification factor of said optical amplifier in accordance with the judging.

2. An optical transmission system according to claim 1, wherein
    said noise elimination unit comprises a plurality of filter sections connected to each other in series and each having variable transmissivity for a wavelength band obtained by dividing the amplification band of said optical amplifier into a plurality of wavelength bands; and
    the control section maximizes the transmissivity of any filter section corresponding to a wavelength band in which the signal light exists according to the wavelength information of the signal light, and minimizes the transmissivity of any filter section corresponding to a wavelength band in which the signal light does not exist.

3. An optical transmission system according to claim 2, wherein said plurality of filter sections each include an etalon filter capable of changing transmissivity thereof.

4. An optical transmission system according to claim 3, wherein said etalon filter includes:
    parallel reflective surfaces which multiply reflect an incident light;
    members made of metal or dielectric substance arranged on the outsides of said reflective surfaces; and
    actuators which variably control positions of said members with respect to said reflective surfaces, and changes the transmissivity thereof by adjusting spacing between said reflective surface and said member by said actuator.

5. An optical transmission system according to claim 1, wherein said optical filter is an acousto-optic tunable filter.

6. An optical transmission system according to claim 1, wherein said optical filter is a dynamic gain equalizer.

7. An optical transmission system according to claim 1, wherein said noise elimination unit is provided inside said optical amplifier.

8. An optical transmission system according to claim 7, further comprising:
    wavelength information generating means for monitoring a spectrum of the wavelength multiplexed signal light input to said optical amplifier, and generating the wavelength information of the signal light based on said monitoring, to provide the wavelength information to said noise elimination unit.

9. An optical transmission system according to claim 7, further comprising:
    wavelength information generating means for monitoring an optical supervisory channel input together with the wavelength division multiplexed signal light to said optical amplifier, and generating the wavelength information of the signal light based on said monitoring, to provide the wavelength information to said noise elimination unit.

10. An optical transmission system according to claim 1, wherein said noise elimination unit is connected to an input end of said optical amplifier.

11. An optical transmission system according to claim 1, wherein said optical amplifier is a rare-earth element doped fiber optical amplifier.

12. An optical transmission system according to claim 1, wherein said optical amplifier is connected in multi-stages on a transmission path, and said noise elimination unit is arranged corresponding to each of said optical amplifiers.

* * * * *